United States Patent
Tapper

(10) Patent No.: US 6,802,125 B2
(45) Date of Patent: Oct. 12, 2004

(54) CABLE-STRIPPING TOOL

(75) Inventor: Johan Tapper, Hedemora (SE)

(73) Assignee: Pressmaster AB, Alvdalen (SE)

( * ) Notice: Subject to any disclaimer, the term of this patent is extended or adjusted under 35 U.S.C. 154(b) by 23 days.

(21) Appl. No.: 10/307,375

(22) Filed: Dec. 2, 2002

(65) Prior Publication Data

US 2003/0110636 A1 Jun. 19, 2003

(30) Foreign Application Priority Data

Dec. 19, 2001 (SE) .............................................. 0104297

(51) Int. Cl.⁷ .............................................. B26B 27/00
(52) U.S. Cl. .......................... 30/90.1; 30/90.7; 30/90.6
(58) Field of Search ................. 30/90.7, 90.3, 30/90.1, 90.8, 90.4, 90.2, 90.6; 81/9.44

(56) References Cited

U.S. PATENT DOCUMENTS

| | | | | |
|---|---|---|---|---|
| 1,866,095 A | * | 7/1932 | Foley | 30/90.7 |
| 3,535,785 A | * | 10/1970 | Matthews | 30/91.2 |
| 3,881,249 A | * | 5/1975 | Cox, Jr. | 30/90.7 |
| 3,946,487 A | * | 3/1976 | Bieganski | 30/90.7 |
| 4,472,877 A | * | 9/1984 | Undin et al. | 30/90.7 |
| 4,526,068 A | * | 7/1985 | Undin et al. | 81/9.4 |
| 5,345,681 A | * | 9/1994 | Undin | 30/90.7 |
| 6,073,349 A | | 6/2000 | Liversidge | 30/90.7 |
| 6,334,253 B1 | * | 1/2002 | Cheng | 30/90.7 |

FOREIGN PATENT DOCUMENTS

GB       2231732 A  * 11/1990  ............ H02G/1/12

* cited by examiner

Primary Examiner—Kenneth E. Peterson
Assistant Examiner—Omar Flores Sánchez
(74) Attorney, Agent, or Firm—Jacobson Holman PLLC

(57) ABSTRACT

A cable-stripping tool having two parts which can rotate relative to one another about an axis and of which a first part carries a cutting blade in the vicinity of said axis and a second part of which carries a hook which can move axially and which is biased towards an end position relative to the cutting blade by means of a first spring element. A cam disc is non-rotatably connected to the first part and can be moved axially therealong. The cam disc has around its periphery mutually spaced engagement formations which are intended to co-act with a cam follower carried by the second part. A second spring element is adapted to bias the cam disc axially into contact with the cam follower. A third spring element is adapted to rotationally bias the second part relative to the first part.

9 Claims, 2 Drawing Sheets

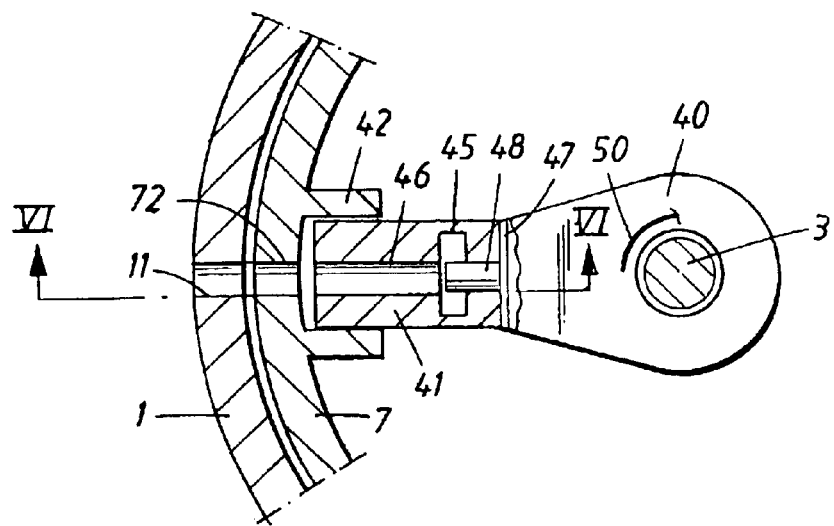
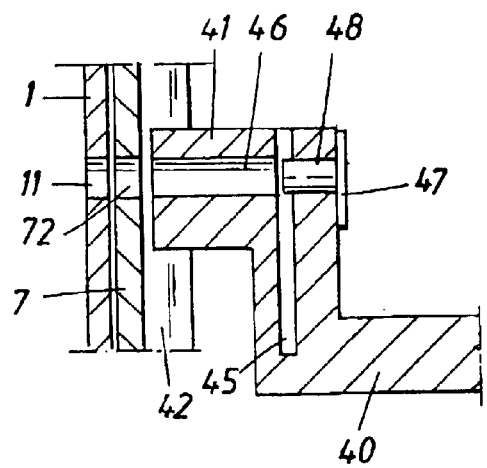
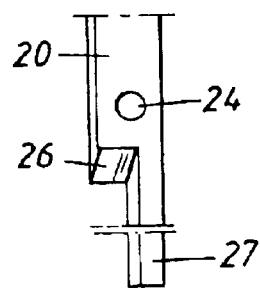

CABLE-STRIPPING TOOL

BACKGROUND OF THE INVENTION

1. Field of the Invention

The present invention relates to a cable-stripping tool having two parts which can rotate relative to one another about an axis and of which a first part carries a cutting blade in the vicinity of the axis and a second part carries a hook which can move axially and which is biased towards an end position relative to the cutting blade by means of a first spring means. The hook has a concave side which faces towards the cutting blade and which functions to receive the cable to be stripped, and the hook also includes a generally axially oriented stem which is received in the tool.

U.S. Pat. No. 6,073,349 teaches a cable-stripping tool which comprises a first part and a second part that can be rotated relative to each other about an axis and of which the first part carries a cutting blade and the second part carries a hook. The hook is axially moveable and is biased towards an end position relative to the cutting blade by means of a first spring means, wherein the hook has a concave side that faces towards the cutting blade for receiving a cable to be stripped, and wherein the hook has a generally axially oriented stem which is received in the tool.

2. Description of the Related Art

In the case of the tool according to U.S. Pat. No. 6,073,349, the first part includes a handle that has a radial shoulder and that is biased by a spring peripherally in relation to the second part, so as to bias the shoulder into abutment with an attachment on the second part, wherein the attachment is displaceable axially and has two axially spaced abutment portions that lie in different circumferential positions and that can co-act with the shoulder to define respectively a first and a second position of rotation of the cutting blade relative to the hook.

The body also includes a further abutment, wherewith the handgrip can be twisted manually relative to the second part against the force of said spring, until the shoulder lies against said further abutment, which defines a third position of rotation.

The first and the second parts are returned to the first position of rotation as soon as the handgrip and the second part are released relative to each other. The positions of rotation correspond respectively to blade positions in which the blade is perpendicular to the axial direction of a cable to be stripped and received in the hook, a blade position which is inclined to the axial direction, and a blade position which is parallel with the axial direction.

One drawback with a tool of this known kind is that the first and second parts have mutually a rotational end position which must be maintained by continuous setting of torque manually and requiring manual procedures to be carried out in order to switch between the two remaining rotational positions.

A further drawback is that the body, and therewith the cutting blade, take two different positions of rotation when the tool is relieved of load.

Another drawback is that it is necessary to undertake comprehensive dismantling of the tool in order to change the hook.

Another drawback is that hook elements of mutually different effective lengths are not commercially available in respect of the tool.

SUMMARY OF THE INVENTION

One object of the invention is to provide a tool of the aforesaid kind with which the cutting blade can be set stably in pre-selected orientations relative to the body/hook, by manually twisting the handgrip relative to the body. A further object is to ensure that the blade will return to a predetermined position relative to the hook when the load on the hook is quickly relieved in an axial direction.

Yet a further object is to provide a tool construction that enables tool hooks to be easily exchanged, and to provide hooks of different effective lengths.

Still another object is to provide a tool construction in which the free end of the hook stem forms an instrument with which a hook element can be easily released from the tool.

These objects are achieved, either fully or partially, with a cable-stripping tool constructed in accordance with the invention.

According to an important feature of the invention, the tool includes a cam disc which is non-rotatably coupled to the first part and arranged for axial movement therealong. That side of the cam disc which lies proximal to the cutting blade has engagement formations disposed in spaced relationship around its periphery. A cam follower carried by the second part is able to co-act with said formations in order to set the blade in corresponding positions relative to the second part. A second spring means functions to axially bias the cam disc into contact with the cam follower at a pre-chosen force. A third spring means functions to rotatably bias the second part to a pre-selected position of rotation relative to the first part or handgrip, in which the blade may be perpendicular to a cable gripped by the hook.

The first part includes a hollow handgrip and a pin which is disposed centrally in the handgrip and which carries a cutting blade. The second part is a body which is rotatably mounted in the handgrip and which has a pin-receiving recess.

In one preferred embodiment, the hook element is adapted to be brought into contact with the cam disc, either directly or indirectly, through the medium of its spring when the hook element is released so that the cam disc will be displaced axially, at least briefly, and pass free from the cam follower. During this brief time period, the third spring means is able to twist/rotate the body and the handgrip to a predetermined, normal position.

The cam disc formations and the cam follower are by force and shape coupled, for instance by being rounded to enable the cam follower disc to be rotatably displaced relative to the cam follower by manually twisting the handgrip relative to the body, wherewith the second spring means functions to permit axial displacement of the cam disc on the one hand and to maintain the contact between the cam follower and the cam disc on the other hand, so as to hold the cam disc, and therewith also the cutting blade, in set positions against the action of the second spring means.

The stem portion of the hook is preferably received in a releasable latching arrangement on a carrier element which can be moved axially along the pin and which is secured against rotation relative to the body. The handgrip and the body have openings which, in the normal position of the cam disc relative to the body, are in alignment with each other and with a release latch in the latching device, whereby the latch can be released by inserting an instrument through the openings so as to enable the stem part of the hook to be withdrawn from the carrier element in conjunction with effecting a hook exchange. The tool includes associated exchange hooks or replacement hooks, and the free ends of respective hook stems each have the form of a pin which forms said instrument. The tool may also include a number of readily replaced hooks of mutually different effective lengths that adapt the tool to cables of mutually different diameters. The latches may be pretensioned towards latching positions, and the free stem-portion of the hook may have a wedge shape so as to move the latch away from its latching position when inserting the hook stem into the carrier element, until the latching element engages in a latching recess in the hook stem under the action of spring bias.

An inventive cable-stripping tool will now be described by way of example and with reference to the accompanying drawings.

BRIEF DESCRIPTION OF THE DRAWINGS

FIG. 5 is a view corresponding to the view in FIG. 2 and shows a variant of the hook-stem carrier element.

FIG. 6 is a schematic sectional view taken on the line VI—VI in FIG. 5.

FIG. 7 is a schematic illustration of the end-part of the hook stem.

FIGS. 1–4 illustrate a cable-stripping tool for stripping a cable 30.

DETAILED DESCRIPTION OF THE PREFERRED EMBODIMENTS

Figure 1:
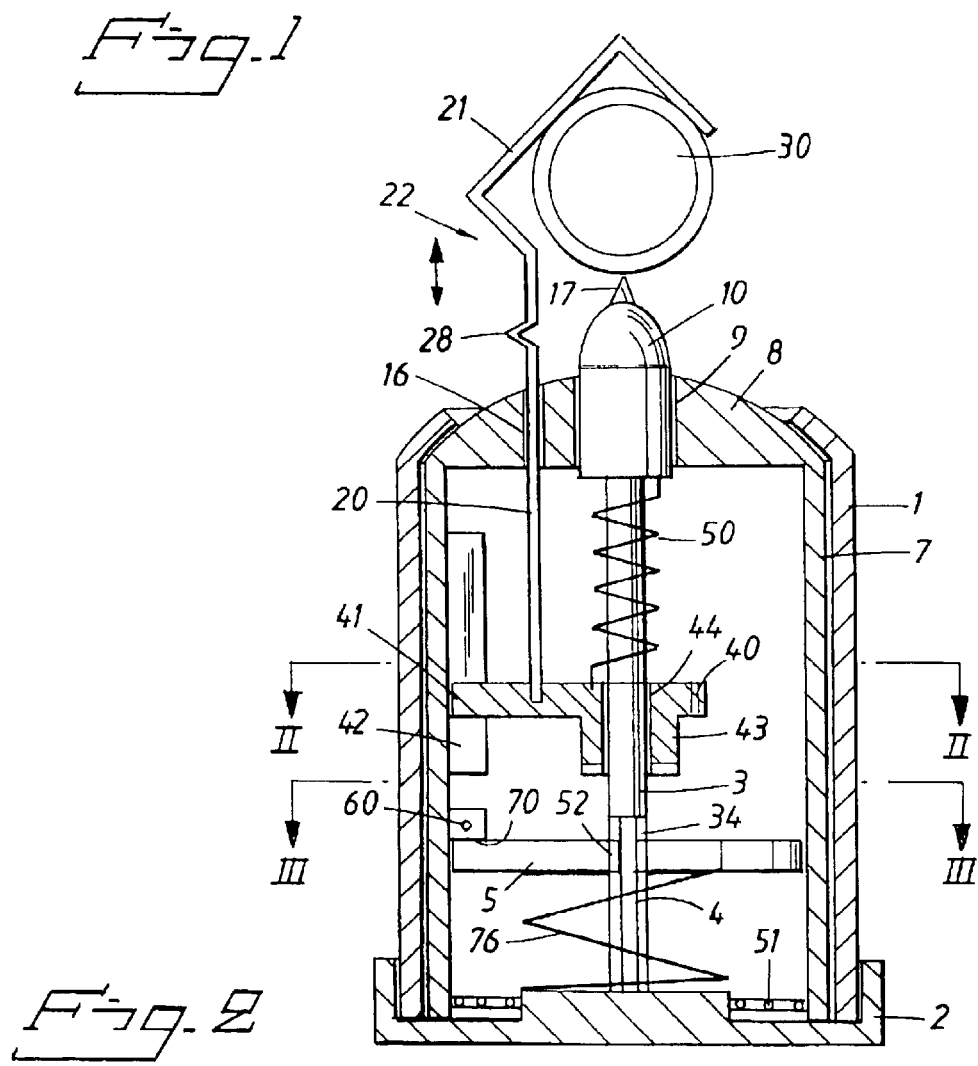
FIG. 1 is a schematic axial section view of an inventive cable-stripping tool.
Figure 2:
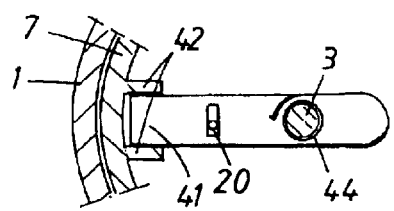
FIG. 2 is a schematic view taken on the line II—II in FIG. 1.
Figure 3:
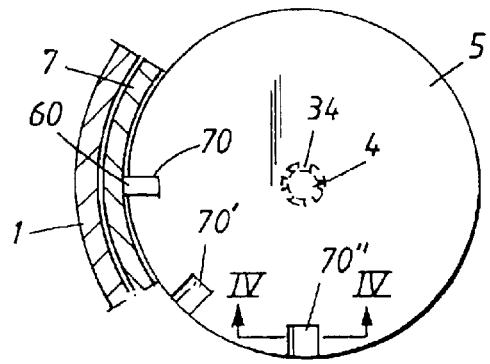
FIG. 3 is a schematic sectional view taken on the line III—III in FIG. 1.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The tool includes a generally tubular handgrip 1 that has a bottom 2 which carries a central pin 3, an end-part 10 of which extends out of the tool and carries a cutting blade 17. A body 7 is mounted for rotation relative to the handgrip 1 in the tubular tool.

The body includes an end wall 8 that has a central opening 9 through which the end-part 10 of the pin extends. In an eccentric position, the end wall 8 has an opening 16 for receiving a straight shaft or hook stem 20 whose end is connected to a carrier element 40 that can be moved axially relative to the body but that is non-rotatable in relation thereto. It will be seen that the carrier element 40 has an opening 44 through which the pin 3 extends. The element 40 includes a nose 41 that engages between two axially extending and parallel guide flanges 42 on the body 7.

The hook 22 has a hook part 21 which is adapted to centre the cable 30 in relation to the cutting blade 17.

A spring 50 acts axially between the end-part 10 of the pin 3 and the carrier element 40 such as to urge the cable 30 against the cutting blade 17 through the medium of the hook part 21 of the hook element 22.

The bottom end-part of the pin 3 carries axial splines 4 which engage with corresponding axial splines 34 on an opening-defining wall 52 on a cam disc. The cam disc 5 can thus be moved axially along the pin 3 and is secured against rotation relative thereto as a result of the engagement between the spline formations 4, 34.

The body 7 carries a cam follower 60 which co-acts with a peripheral region of the cam disc 5. Mutually spaced in said peripheral region are formations 70', 70" in which the cam follower 60 can engage. Provided between the bottom part 2 of the handgrip and the cam disc 5 is a pressure spring 76 which biases the disc 5 into contact with the cam follower 60.

Located between the handgrip and the body 7 is a spring 51 which strives to return the handgrip 1 and the body 7 towards a mutual position of rotation in which the cam follower 60 rests on the upper side of the cam disc in a position 70 which, for instance, may correspond to the blade 17 lying in a plane normal to the axial direction of the cable 30.

The formation 70' (rounded recess) on the cam disc can define, in co-action with the cam follower 60, a cutting blade orientation in which the blade 17 cuts a helical slit in the cable casing as the tool (the hook 21) rotates about the cable axis. The third formation 70" corresponds to the cutting blade 17 lying in an axial plane of the cable 30. The cutting blade 17 can thus be set to stable positions of rotation relative to the body 7, with the aid of the recesses 70', 70" and the cam follower 60, and therewith relative to the hook 22, against the action of the spring 51.

FIG. 1 shows a downwardly and forwardly projecting cylindrical part 43 on the carrier, element 40.

When the hook element 22 is released from a position in which the spring 50 is pressure-loaded, the hook and its carrier element 40 will move down into contact with the cam disc 5, wherein the characteristic and stroke length of the spring 50 is chosen so that the for-wardly projecting part 43 of the carrier element will drive the cam disc 5 down against the action of its axial biasing spring 76, so that the disc 5 will pass free from its engagement with the cam follower 60. The spring 51 then returns the handgrip 1 and the body 7 to a normal position whilst the cam disc is out of contact with the cam follower.

Figure 4:
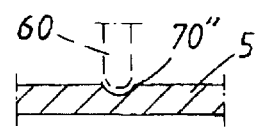
FIG. 4 is a schematic sectional view taken on the line IV—IV in FIG. 3.

It will be seen from FIG. 4 that the formations/recesses 70', 70" in the cam disc 5 and the cam follower 60 are rounded so that when the hook 22 is applied to a cable 30 an operator can cause the cam disc 5 to be turned so that the cam follower 60 will be received in a chosen recess 70', 70" by manually twisting the handgrip 1, wherewith co-action between the cam follower and the recess establishes a lock against rotation, even against the action of the return spring 51. Naturally, this mutual rotation between the handgrip 1 and the body 7 must allow the cam follower 60 and the cam disc 5 to move axially, which is permitted by the spring 76. The spring 76 in combination with the curvatures of the cam follower 60 and the co-action of the recesses 70 can thus provide a retaining force against the action of the return spring 51. Moreover, the cam follower 60 and the recesses 70 shall provide a wedging effect which results in axial displacement of the cam disc against the spring 76 in response to an applied torque.

It will be seen from FIG. 5 that the carrier element 40 has an axially directed recess 45 which receives the bottom end-part of the hook stem 20. The nose part 41 of said carrier element has a radially extending channel 46 which is aligned with an opening 72 in the body 7 and an opening 11 in the handgrip 1 when the tool is in its normal state, towards which it is biased by the spring 51.

It will also be seen that a spring tongue 47 affixed to the carrier element 40 carries a locking pin 48 which extends through a corresponding guide and into the channel 45 so as to be able to engage a latch opening 24 in the hook stem 20 when said stem is inserted down into the channel 45. It will also be seen that the end of the hook stem 20 has a bevel 26 that forms a wedge surface which will function to move the locking pin 48 away as the hook stem 20 is inserted into the channel 45.

It will also be seen that the end-part of the hook stem includes a narrow, elongate rod portion 27. The rod portion 27 on the stem-end of a replacement hook 22 can be inserted through the openings 11, 72 and through the channel 46 so as to press the latch pin 48 to one side and out of the opening 24, whereafter the hook element 22 of said tool can be lifted up to pass free from the latch pin 48 and the rod portion 27 of the replacement hook can then be drawn out to permit continued withdrawal of the hook element 22 of said tool.

The stem-part of the replacement hook can then be easily placed in position through the eccentric guide channel 16, and down into the receiving channel 45 of the carrier element, wherewith the spring element 47 causes the carrier pin 48 to engage with the opening 24 when the stem 20 is positioned correctly in the element 40.

The bottom plate 2 of said handgrip may include a container for storing replacement cutting blades 17.

The hook stem may have a shoulder or ledge 28 that co-acts with the upper side 8 of the body, so as to define a hook end position. The latch mechanism for fastening the hook stem will then be exposed through the openings.

The spring 50 may be adapted to knock down the cam disc temporarily out of contact with the cam follower, although the spring 50 may alternatively be made stronger than the spring 76, so that the cam disc 5 will be held depressed at a distance beneath the cam follower 60 when the tool is unloaded (no cable in the hook). The hook stem 20 may have an abutment that co-acts with the upper side of the end-wall 8 of said body 7.

As a cable 30 is inserted into the hook, the hook is lifted so that the spring 50 will no longer act on the cam disc 5, wherewith the spring 76 is able to press the cam disc 5 against the cam follower 60. The body 7 and the handgrip 1 can now be turned manually to stable rotational positions defined by the engagement of the cam follower 60 with respective formations 70, 70', 70" on the cam disc 5.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A cable-stripping tool comprising
   a first part and a second part which can rotate relative to one another about an axis, said first part carrying a cutting blade in a vicinity of said axis and said second part carrying a hook element which can move axially and which is biased towards an end position relative to the cutting blade by means of a first spring element, a hook portion of said hook element having a concave side which faces towards the cutting blade and which functions to receive a cable to be stripped, said hook element also including a generally axially oriented stem which is received in the tool;
   a cam disc non-rotatably connected to the first part by means of connecting elements and which can be moved axially along said first part;
   said cam disc having around a periphery thereof mutually spaced engagement formations for coacting with a cam follower carried by the second part for setting the cutting blade in corresponding positions relative to the second part;
   a second spring element adapted to bias the cam disc axially into contact with the cam follower; and
   a third spring element for rotationally biasing the second part towards a pre-selected rotational position relative to said first part;
   said cam follower and the engagement formations being frictionally engaged to permit rotation of the cam disc relative to the cam follower upon manual application of torque between the first part and the second part while otherwise allowing the cam follower to remain in engagement with an engagement formation on the cam disc against an action of said third spring element.

2. The tool according to claim 1, wherein the stem of the hook element is carried by an axially movable carrier element that is non-rotationally fixed relative to the second part, said first spring element being adapted to displace the cam disc against action of the second spring element, either directly or indirectly, when the hook element is relieved of load axially, so that the engagement formations on the cam disc will pass free from the cam follower thereby enabling the third spring element to rotate the second part and the first part to a predetermined normal position.

3. The tool according to claim 2, wherein when the hook element is relieved of load the first spring element functions to cause the hook element to temporarily knock the cam disc out of engagement with the cam follower via the carrier element so that the third spring element can return the first and the second parts to their normal position of relative rotation before the second spring element returns the cam disc into engagement with the cam follower after the first spring element has withdrawn the carrier element.

4. The tool according to claim 2, wherein in an absence of axial external loading of the hook element, the first spring element functions to drive the cam disc away from the cam follower via the carrier element and against action of the second spring means (76) said hook element when withdrawn from its end position functioning to lift the carrier element from the cam disc to allow the second spring element to bring the cam disc into contact with the cam follower.

5. The tool according to claim 1, wherein the stem of the hook element is received in a releasable latching arrangement, said first part and said second part including openings which in a normal position of the cam disc relative to the second part are in alignment with each other and also with a channel through a nose of the carrier element and with a latching element in the latching arrangement, whereby the stem of the hook element can be released from the latching arrangement by inserting a rod through the openings into contact with the latching element.

6. The tool according to claim 5, wherein the rod is formed by a free end of said stem.

7. The tool according to claim 5, wherein the stem of the hook element has a wedge-shaped surface and an opening, said opening for receiving the latching element and said wedge-shaped surface for moving the latching element away as the hook stem is inserted down into the carrier element.

8. The tool according to claim 1, further including replacement or exchange hooks that have different effective lengths for adapting the tool to cables of mutually different diameters.

9. The tool according to claim 1, wherein the first part includes a hollow handgrip with a pin disposed centrally therein, said second part including a body which is rotatably mounted in the handgrip, said pin having an end portion that extends from one end of the handgrip and carries the cutting blade, and the hook element being coupled non-rotatably to the second part.

* * * * *